United States Patent [19]
Fitch et al.

[11] Patent Number: 5,344,664
[45] Date of Patent: Sep. 6, 1994

[54] LOW-FAT CONFECTIONARY MATERIAL AND PROCESS FOR MAKING SAME

[75] Inventors: Mark D. Fitch, Stonybrook; Gerard Eckhardt, Bellmore; Wendy A. Anderson, New York, all of N.Y.; Mario A. Anelich, Dumont, N.J.; Barry N. Frake, Northport, N.Y.; Kevin W. Lang, Lloyd Neck, N.Y.; Alfred Mannheimer, Northport, N.Y.

[73] Assignee: Kraft General Foods, Inc., Northfield, Ill.

[21] Appl. No.: 112,740

[22] Filed: Aug. 26, 1993

Related U.S. Application Data

[63] Continuation-in-part of Ser. No. 839,525, Feb. 20, 1992, abandoned.

[51] Int. Cl.$^5$ .......................... A23G 3/00; A23G 1/00
[52] U.S. Cl. ..................................... 426/631; 426/653; 426/660; 426/804; 426/654
[58] Field of Search ............... 426/631, 660, 653, 804, 426/654

[56] References Cited

U.S. PATENT DOCUMENTS

| | | | |
|---|---|---|---|
| 3,901,977 | 8/1975 | Rebane | 426/631 |
| 4,643,907 | 2/1987 | Player et al. | 426/653 |
| 4,714,620 | 12/1987 | Bunich et al. | 426/804 |
| 4,732,767 | 3/1988 | Seiden et al. | 426/654 |
| 4,774,099 | 9/1988 | Feeney et al. | 426/804 |
| 4,810,516 | 3/1989 | Kong Chan | 426/654 |
| 4,814,195 | 3/1989 | Yokoyama et al. | 426/804 |
| 5,120,566 | 6/1992 | Baba et al. | 426/631 |
| 5,133,984 | 7/1992 | Murphy et al. | 426/496 |
| 5,190,786 | 3/1993 | Anderson et al. | 426/631 |
| 5,258,199 | 11/1993 | Moore et al. | 426/660 |

FOREIGN PATENT DOCUMENTS 9119421 12/1991 PCT Int'l Appl. .
9119423 12/1991 PCT Int'l Appl. .

*Primary Examiner*—Jeanette Hunter
*Attorney, Agent, or Firm*—Thomas R. Savoie; Thomas A. Marcoux

[57] ABSTRACT

Fat in a confectionary chip is reduced to below about 10% by using a low-fat insoluble, non-gummy food material and 40-70% small particle sugar (less than 100 microns) in combination with about 13% moisture. The sugar to non-gummy food material ratio must be between 2:1 and 4:1 and the moisture between about 10% to about 15%. Hydrated food ingredients are added to retain at least some of the moisture in the bound state. Other ingredients which may be added to the formulation include syrups, milk solids and starch. The chips can be made by simply blending the dry ingredients and adding the moisture to form a dough in the form of a dry, crumbly paste. The dough is mixed or worked up well and then formed into the desired shape. The shape is then cut into pieces similar to chocolate chips.

24 Claims, No Drawings

LOW-FAT CONFECTIONARY MATERIAL AND PROCESS FOR MAKING SAME

This application is a continuation-in-part of Ser. No. 839,525, filed Feb. 20, 1992 and now abandoned.

TECHNICAL FIELD

The present invention relates to a low-fat confectionary material, such as a chip or bit and, more particularly, to a thermostable low-fat confectionary chip suitable for use in fat-free products such as baked goods, cookies, confections, instant puddings and ice cream. Low-fat confectionary material, as defined in this invention, means below ⅓ the level of fat normally found in the traditional material. For example, in the case of a chocolate chip, the cocoa butter present in the chocolaty chip of this invention is below 10%, preferably below 1%. Fat-free products, as defined in this invention, means less than ½ gram of fat per serving. These products can include chocolate chips having up to 10% cocoa butter in the chip. Additionally, the invention relates to methods of making a low-fat confectionary chips and incorporating these chips into fat-free food products.

DESCRIPTION OF THE PRIOR ART

Many prior art disclosures recite the incorporation of water-binding materials, such as gums and cellulosic fiber, into food products to reduce the fat content of these products. These teachings, however, have not enabled the production of high-quality, low-fat confectionary chips, such as chocolate chips, which have been widely accepted in the marketplace. Among such prior art patents are: U.S. Pat. Nos. 3,234,027 to Jertson et al.; 3,574,634 to Singer; 4,109,018 to Thompson; 4,143,163 to Hutchinson et al.; 4,198,438 to Singer et al.; 4,219,580 to Torres; 4,424,237 to Wittman; 4,431,681 to Hegedus et al.; 4,451,490 to Silverman et al.,; 4,503,083 to Glicksman et al.; 4,774,009 to Feeney et al.; 4,824,683 to Hodgson et al.; and published EPO application 340,035 and published PCT application 89/01813 both to Chen et al. U.S. Pat. No. 4,664,927 to Finkel (Example 5) shows an imitation chocolate wherein the cocoa butter in the chocolate is replaced with hard butter. However, the Finkel product does not produce a low-fat chocolate-flavored material.

There are no low-fat chips which have good textural, flavor and functional characteristics. The functional attributes necessary for chips in baked goods include the thermal stability to retain distinct shape throughout the heat of baking, and the mechanical stability to remain intact during the dough or batter mixing stage of a product. Making a low-fat chip requires a unique approach to formulation and processing. In the case of a chocolate chip, the cocoa butter is 36% of the formula (by weight), and it functions as an ingredient binder, a structural agent, a flavor carrier, and a textural or mouthfeel agent. The main requirements for confectionery fats are a reasonably hard consistency, stability, and a short melting range just below body temperature. Cocoa butter is the primary fat source found in chocolate, and is defined as the edible fat obtained from cocoa beans. Cocoa butter exhibits a sharp melting point at 98° F., with a softening of the cocoa butter around 90° F. This melt profile of the cocoa butter provides the primary functional role of fat in chocolate, the "melt-in-the-mouth" textural properties. Cocoa butter also contracts upon solidification which allows molding and shaping of chocolate without sticking to the molds.

The cocoa butter in a traditional chocolate chip serves several functions. First, it provides the sensory benefits of a creamy mouthfeel due to the fact that cocoa butter melts sharply at 98° F. The fat also carries flavor and allows this flavor to dwell on the taste buds, thereby enhancing the chocolate sensation. In addition to the sensory benefits of fat in chocolate, the fat serves several functional roles in the chocolate piece. The fat binds the cocoa and sugar together to form a paste. It provides the structure of the piece, and it lubricates and contracts to self-extract from molds. Lastly, the cocoa butter, in combination with sugar, provides a fragile but definite structure to the chip during baking so that the chip retains it's shape in the oven. In order to simulate chocolate without using fats, all of the above mentioned benefits must be addressed. However, it should be noted that the legal requirements or standards of identity for chocolate require that the chocolate contain more than 30% cocoa butter to be called "chocolate". Thus, a fat-free chocolate-flavored material with little or no added cocoa butter cannot be labelled or called "chocolate" even though it tastes like chocolate. The low-fat material of this invention will be referred to as a "chocolaty material" and will typically be referred to as a "chocolaty chip".

It would be desirable if a fat replacer for the fat, such as cocoa butter, in a confectionary material, such as chocolate, could be produced having the properties of that fat as to mouthfeel, taste, structure and "binding" properties.

It would also be desirable to produce a low-fat confectionary material having good textural, flavor and functional characteristics.

It would still further be desirable if the low-fat confectionary material had the thermal stability to retain its distinct shape throughout the heat of baking, and the mechanical stability to remain intact during the dough or batter mixing stage for making the food product.

SUMMARY OF THE INVENTION

This invention is founded on the discovery that the fat in a confectionary material can be reduced to below about 10%, preferably below about 1%, by mixing granulated sugar and granulated or powdered insoluble, non-gummy food material together at a moisture content of about 10% to about 15%, said sugar comprising a particle size of below 150 microns (preferably below 60 microns) and said sugar to insoluble, non-gummy food material ratio on a weight basis being between about 2:1 and about 4:1.

The insoluble, non-gummy food material can be any existing food ingredient which is insoluble in water and somewhat stable to normal processing conditions. This includes ground cocoa, vanilla, roasted coffee, nuts (peanut, walnut, hazelnut, pecan, cashew, etc.), coconut, cellulose, cereal fiber (oat, wheat, barley rice, corn, etc.), vegetable fiber, insoluble proteins (lactalbumin, egg albumin, zein, legume meal, sunflower seed, cotton seed, etc.), edible mineral salts, citric waste and bone meal. It is preferred that this insoluble, non-gummy material be low in fat content, typically less than 15% fat.

Preferably, a hydrated food ingredient, such as gum, insoluble fiber, and/or protein may be used as a moisture source to provide most or essentially all of the requisite moisture content. These hydrated food ingredients will supply both a source of free moisture and a source of bound or retained moisture. Syrup, milk solids and starch can also be added to the formulations.

The confectionary chip or bit can be made by simply blending the dry ingredients and adding the moisture to form a dough in the form of a dry, crumbly paste. The dough is mixed or worked up well and then formed into a desired shape. The shape is then cut into pieces such as chips or bits.

All ratios, parts, and percentages (%) recited in this Specification and Claims are by weight.

DETAILED DESCRIPTION OF THE INVENTION

This new confection formula resembles a fudge or fondant candy. The traditional methods for making these candy products involves a hot process which adds excess moisture to dissolve the sugar, boils off moisture to supersaturate the solution, and then agitates to form small, uniform sugar crystals which are smooth in mouthfeel and provide shape to the end product. The resulting mix is very sticky and hard to shape and cut during processing. The processing portion of this invention eliminates the addition of excess water to the formula. Using a small particle sugar (preferably less than 60 microns) for smoothness, and adding no more than about 15% total moisture, the process is simplified. This cold process requires mixing the ingredients and forcing them through a die supplied with a rotary knife to cut off small lengths, then tumbling the cut pieces to round off and smooth the surfaces. In this cold process, the flavor profile is improved due to the elimination of heat degradation of the flavor systems. Important parameters include: control of added moisture, control of the amount of work added to the dough, and control of the ratios of sugar to the powdered insoluble, non-gummy food material, such as cocoa in the case of a chocolate chip. These chips are relatively easy to make and perform very well in baked products. The chips resist crumbling in the mixer, and retain their shape during baking.

Chocolate chips are normally made from chocolate. Standard chocolate recipes call for sugar, cocoa, cocoa butter, milk solids, lecithin, an emulsifier, vanillin and flavors. According to this invention, this standard recipe can be altered by reducing the fat (cocoa butter) and replacing it with small particle size sugar and low-fat cocoa (under 15% fat) at a ratio of between about 2:1 and about 4:1 in combination with a total moisture level about 10-15% to thereby make a low-fat chip. The moisture is usually added in the form of food ingredients used in the formula. However, it is preferred to use an aqueous dispersion containing hydrated food materials capable of releasing moisture to the low-fat cocoa powder and sugar while at the same time retaining some of the moisture in the bound state. This aqueous dispersion can be used as a partial or total source of moisture. Suitable food ingredients for use in the aqueous dispersions include hydrated polysaccharide hydrocolloids, hydrated insoluble fiber, hydrated protein material or a mixture of these, preferably a mixture of all three.

The low-fat cocoa, small particle sugar and selected hydrated food ingredients in the aqueous dispersion serve not only as the fat replacement but also as the primary flavor carrier and ingredient binder for this chip. Thus, the cocoa butter, and emulsifiers can be eliminated and an excellent low-fat chocolaty chip can be made. The small particle sugar is typically sucrose, but other crystalline sugars can be used. The sucrose or other small granular sugar must be in powdered or crystalline form and have a small particle size of below about 150 microns, preferably below 100 microns, and most preferably under 60 microns, say 30 to 50 microns in particle size. The small particle size contributes to the desired "melt-in-the-mouth" sensation that traditional chocolate chips exhibit.

In the case of a nut chip, the cocoa powder is simply replaced with a low-fat nut flour, such as peanut flour having less than 15% fat, but the same ratios apply. If a full fat peanut flour is used, it may be mixed with a vegetable fiber or cereal fiber to lower the fat content of the insoluble, non-gummy food material to under 15% fat. In the case of a "white" or neutral chip, only a vegetable fiber may be used, but the level of milk solids may have to be increased.

The preferred hydrated food ingredients in the aqueous dispersion are hydrated polysaccharide hydrocolloids in combination with hydrated insoluble fibers, and protein materials. These hydrated food ingredients help to give the low-fat chip of this invention texture, mouthfeel, softness, and fatty mouthfeel similar to traditional chocolate. They also prevent moisture migration and impart lubricity to the product.

It is possible to use hydrated polysaccharide hydrocolloids, hydrated insoluble fiber, or hydrated protein dispersions alone or in any combination thereof while still producing an acceptable confectionary chip. In fact, any solid food material which is hydrated and capable of releasing its moisture to the surrounding chip ingredients can be used.

The hydrated, polysaccharide hydrocolloids, insoluble fiber and/or protein material apparently are able to function as a reservoir of bound moisture capable of slowly releasing this moisture from the chip into a cookie or other baked product. It is also speculated that, in any fiber-polysaccharide hydrocolloid combination, the fiber component disrupts or reduces any gummy texture which could result from the presence of the polysaccharide hydrocolloids. The polysaccharide hydrocolloids, insoluble fiber and/or protein are incorporated into the chip in a hydrated state, typically in a single, preformed aqueous dispersion. However, it is possible to utilize separate aqueous dispersions for each of the materials to be hydrated. Each of these hydrated materials can be used alone, as the partial or total moisture source. The addition of unhydrated polysaccharide hydrocolloids, insoluble fiber and/or protein directly to chip ingredients together with a separate portion of water is discouraged since this does not usually provide enough water and/or time to permit adequate hydration. Materials such as cocoa and sugar absorb large amounts of water before the polysaccharide hydrocolloids, insoluble fiber and/or protein materials are hydrated. The added aqueous dispersion preferably should have a thick, paste-like consistency and a viscosity of at least 6, preferably at least 12, as measured at 40° F. using a Brookfield Model HAT Viscometer with a helipath stand and a size-D, T-Bar spindle at 5 RPMs (scale 0-100). The aqueous dispersion should also have a solids content, basis the amount of polysaccharide hydrocolloid, insoluble fiber, protein and water components present in the dispersion, of from 2 to 35% by weight, preferably from 5 to 30% and most preferably from 9 to 25%.

The polysaccharide hydrocolloids used in this invention as a partial or total moisture source are preferably water-soluble, non-gelling gums, such as xanthan, guar, methylcellulose, carboxymethyl cellulose and the like. Gums which form gels, such as alginates, pectin, kappa and iota carrageenan and the like while not preferred can also be used. Non-polysaccharide hydrocolloids, such as gelatin, can also be used. A combination of an anionic polysaccharide hydrocolloid and a galactomannan polysaccharide hydrocolloid is preferred. The anionic polysaccharide should include within its molecular structure dependent carboxylic acid groups. Xanthan gum and carboxymethyl cellulose are such polysaccharides. Galactomannans are polysaccharide composed solely of mannose and galactose. Guar gum, a galactomannan which has a mannose-to-galactose ratio of about 1.8:1 has proven to be well-suited for this use. Combinations of xanthan gum and guar at a weight ratio of 1:4 to 4:1, preferably about 1:1, have been found to be highly suitable. Xanthan gum is a high molecular weight polysaccharide which is obtained by pure culture fermentation of glucose with a bacterium of the genus Xanthamonas, such as *Xanthomones camoestris*. Xanthan is a heteropolysaccharide made up of building blocks of D-glucose, D-mannose and D-glucuronic acid. Guar gum is isolated from the seeds of the guar bean (*Cyamposis Tetragonaolobas L. taub.*) which is native to India and Pakistan.

The insoluble fiber which may be employed in this invention as a partial or total moisture source can be any edible fiber material, including powdered cellulose (at least 95% insoluble fiber). Fiber derived from cereal grains (e.g., oat, wheat, corn, soy, etc.) is well-suited for use in this invention. Oat fiber, which contains a relatively-high level (at least 85%) of insoluble fiber, soy fiber and wheat fiber have been successfully used in the practice of this invention.

The protein material which can be used in this invention as a partial or total moisture source may be an essentially-pure protein, as in the case of whey protein or casein, or as part of a protein containing material, such as dry non-fat milk solids, dried egg whites, soy protein, wheat protein, wheat gluten, etc. Non-fat milk solids (about 36% protein) and wheat gluten have been found to be useful. Proteins, such as casein, which form protein micelles in an aqueous dispersion should also be suitable. The protein may be at least partially denatured as denatured protein has higher water absorption properties than undenatured protein.

According to this invention, the dispersions may be used in place of fat. Preferably the dispersions are prepared so that the use of the dispersion for fat will be at a ratio of 0.5–1.5:1, typically about 1:1. Baked goods such as chocolaty chip cookies which have a fat content of less than 0.5 grams per serving are considered to be included in the term "fat-free".

The polysaccharide hydrocolloids should be included in chip formulations at a level of from 0.1 to 4.0, preferably 0.25 to 2.0, parts per 100 parts of solid sugar used in the formulation. The insoluble fiber should be used at a level of 0.1 to 5.0, preferably 0.1 to 2.0 per 100 parts of solid sugar. Protein should be included in the chip formulation at a level of at least 0.1 to 8.0, preferably 0.5 to 3 parts per 100 parts of solid sugar. It will be desirable that the ratio of hydrocolloid to protein in the dispersion be from 1:1–4.5.

A benefit derived from the use of a prepared aqueous dispersion is that any of the materials contained therein can be hydrated at a location or time remote from the production of the chip. According to a specific embodiment of this invention, aqueous dispersions are prepared which contain polysaccharide hydrocolloid, insoluble fiber and protein at a weight ratio of 1:0.8–6.0:1.1–4.5, preferably 1:1.5–2.0;2.0–3.0. The aqueous dispersion may be prepared by any technique which both hydrates the ingredients and produces a uniform distribution of solids within a stable aqueous dispersion. Typically, a procedure is followed in which the dry ingredients are first combined in a batch-type mixer and the resulting mix is passed through a mixing unit which will produce a uniform aqueous dispersion, such as a homogenizer or a continuous mixer. Thereafter, the dispersion should be pasteurized such as by heating to above about 160° F. for up to ten minutes. The dispersion is preferably maintained at about 40° F. or below in order to ensure microbial stability. Cooling of the dispersion below 45° F. prior to use in the chocolaty chip is thought to be desirable even in the event the dispersion is utilized immediately after production.

A generic version of the formulation for the confectionary chip of this invention is as follows:

| Ingredients | Range % by Weight | Preferred % by Weight |
| --- | --- | --- |
| Sugar (solid) | 40–70 | 55–65 |
| Low-fat Insoluble, Non-Gummy Food Moisture Source | 12–35 | 15–25 |
| | 6–18 | 9–15 |
| Syrup | 2–6 | 3–5 |
| Non-Fat Milk Solids | 2–6 | 3–5 |
| Flavor/Salt | 0.1–2.0 | 0.1–2.0 |

The solid sugar is preferably sucrose, but other crystalline sugars, such as dextrose, glucose, lactose, fructose, maltose, etc. can be used. Also, other liquid sugars can be added to the solid sugar as long as the solid sugar to liquid sugar ratio is kept above 5:1. Most preferably, at least 80% of the total sugar is crystalline sucrose. The solid sugars should have a small particle size of less than 150 microns, preferably less than 100 microns and most preferably less than 60 microns. Confectionary sugar (10X) has a suitable particle size of about 50 microns for the chip formulation. However, the smaller the particle size of the sugar, the better the mouthfeel. The low-fat insoluble, non-gummy food material can be ground cocoa, vanilla, roasted coffee, nuts (peanut, walnut, hazelnut, pecan, cashew, etc.), coconut, cellulose, cereal fiber (oat, wheat, barley rice, corn, etc.), vegetable fiber, insoluble proteins (lactalbumin, egg albumin, zein, legume meal, sunflower seed, cotton seed, etc.), edible mineral salts, citric waste and bone meal. In fact, any existing food material that is insoluble in water and stable against normal processing conditions can be used. High fat containing food materials, such as cocoa powder and peanut flour are preferably defatted to a level of under 15% fat. Of course, lower fat levels of below about 2% and below about 1% are most preferred. In the case of a vegetable fiber or cereal fiber, no defatting is necessary since little or no fat exists. This latter material can be mixed with the high fat material (such as cocoa or peanut) to lower the fat content to below 15% fat. The moisture source, as stated, can be any edible food material capable of delivering up to the required 10–15% moisture to the chip. However, it is preferable that most of the moisture be supplied in the form of one of the moisture sources enumerated above. The syrup can be any liquid sugar which does not crystallize out during processing, is highly hygroscopic, and provides softness to the confectionary chip. Suitable syrups that can be used in the formulation are invert sugar, glycerin, high fructose corn syrup and fructose syrup. The non-fat milk solids may be any dry, low fat milk solids. The milk solids help to mellow the flavor of the chips and help to bring out desired flavor. The flavors may include natural, artificial or a combination of natural and artificial flavors. The salt is useful as an hygroscopic agent to help control water activity and enhance flavor in the chip. Crystalline fructose (particle size under 150 microns) can also be used as a hygroscopic agent to control the water activity in the formulation.

The sensory benefits of a confectionary mouthfeel are addressed in two different manners. A fatty mouthfeel is simulated with about 10 to 15% moisture, in combination with small particle sugars (less than 150 microns and preferably under about 60 microns) which are not perceived as "grainy" in the mouth. The moisture and sugar provide a "melt-in-the-mouth" sensation as the sugar dissolves in the saliva.

In the case of chocolate chips, the flavor systems are addressed by addition of cocoa powder and chocolate flavor either artificial, natural or both. The flavor can be enhanced by the use of refined chocolate powder or cocoa which has undergone dutching to develop a more intense chocolaty flavor. This chocolate powder and/or dutched cocoa can then be ground to between about 20 to 28 microns and blended with the natural cocoa powder to give a better chocolate flavor. Since the chocolate powder contains cocoa butter, care has to be taken to keep the level sufficiently low so as not to exceed the low-fat requirements.

As previously mentioned, in regular chocolate chips, the sugar and fat provides structure to the chip. However, since the chips of this invention have virtually no fat, other ingredients must combine with the sugar to provide the desired structure to the chip. The chip consists of sugar and cocoa held together using a moisture source. The moisture source as well as the sugar crystals provide structure to the chocolate piece. The moisture source adds mechanical stability in the mixer as well as thermal stability in the oven. In order to achieve that stability, several factors must be controlled.

The ratio of crystalline sugar to the insoluble, non-gummy food material is critical in making the low-fat confectionary material of this invention. In the case of chocolaty chips, the optimal sugar to cocoa ratio is between 2:1 and 4:1. If the sugar to cocoa level is greater than 4:1, the chip will melt very quickly in the oven. If the sugar to cocoa level is less than 2:1, the chip will have very high thermal stability, but a low mechanical stability and will crumble in the mixer. This same ratio applies in making a nut chip except that peanut flour (defatted to below 15% fat) is used in place of the cocoa. If a full fat peanut flour is used, it must be mixed with a vegetable fiber or a cereal fiber in order to lower the fat content to a suitable level. This produces a suitable nut chip which can be flavored to provide a walnut, hazelnut, pecan or other nut flavor. In the case where a "white" chip is desired, this can be made by using only a vegetable fiber or a cereal fiber in place of the cocoa powder.

In addition to major ingredient ratios, the total moisture content is critical to chip stability, both mechanical and thermal. As the total moisture content rises above about 15%, the chip paste becomes very sticky and difficult to process, the thermal stability during baking decreases, and melting occurs. As the moisture level drops below about 10%, the mechanical stability of the chip decreases and it becomes difficult to form the chip into pieces.

Furthermore, if the moisture is not given an opportunity to redistribute itself after chip formation, the chip will melt during the bake. This can be demonstrated in chips that are "quick frozen" and in chips that are used immediately after formation. The moisture in these "young" chips is not given the time to equilibrate within the chip system and the chips melt during baking. When the chip is "aged", the moisture associates with ingredients in the chip, resulting in a chip that is less likely to melt during baking. This "aging" or "tempering" of the chip can be accomplished in several hours, say 6 to 12 hours, but 24 hours is preferred.

Another way to achieve the "aging" effect is though increased energy added to the chip during the mixing state. This added energy results in a chip with lower moisture (after baking) then the same chip mixed at a lower energy level. The relative energy ratio can be determined by computing the rotational velocity of the mixer on different speed settings. The RPM's at each setting is counted by tying a string around the paddle and running the mixer for a set time. The RPM's are determined directly by counting the number of coils per unit time. The energy ratio is equal to the RPM's squared. Baking studies of chips mixed at an energy ratio above 400:1 based on the rotational speed squared, indicate that the high energy chips have a lower total moisture content postbake, with a larger percentage of this moisture as freezable water. This lower moisture content in the baked chip indicates that the chips mixed at high energy lose more moisture during the baking process than the low energy chips. This lower moisture content results in a higher melt temperature, most likely due to the sugar-water interaction. A likely explanation for this phenomena could be that the high energy added is propagating the growth of very small uniform crystals of sugar which result in pushing the water out of the system. These crystals have a lower total water content, even though the freezable moisture is higher, and therefore have a higher thermal stability.

Another potential mechanism of stability might be that the higher energy mixing exposes new water binding sites on the insoluble, non-gummy food material which comes into intimate contact with the moisture. These sites hold the moisture via capillary action, resulting in a free or freezable moisture that is then quite readily lost to the external chip environment, air or dough, during baking.

An interesting after effect of this additional energy during processing is that the firmness of the resulting cookie decreases and elasticity increases which improves "cookie texture" sensory impressions. This might indicate that the higher work added to the chip during mixing seems to "saturate" the chips with moisture, preventing the chip from extracting moisture from the cookie crumb during baking.

It is possible to formulate and process a low fat confectionary chip by carefully controlling the ratios of primary ingredients as well as the relative energy input and time of processing. Chip processing should involve the highest possible energy of mixing which balances stickiness during processing, mechanical stability during dough mixing and thermal stability in the oven. In the case of chocolaty chips, the sugar to cocoa ratios should be between about 2:1 and about 4:1, and the total moisture content should be below about 15%, preferably about 11% to about 13%, to optimize melting and the mechanical character of the chips. The moisture source in the chips should preferably be a hydrated hydrocolloid system to maximize thermal stability and finished product shelf life.

These same ratios apply in the case of making a nut chip, (using peanut flour and/or a fiber in place of cocoa) and in the case of making a "white" or neutral chip by using a cereal fiber or a vegetable fiber in place of cocoa.

The low-fat confectionary chips can be candy-coated by any of the well-known procedures known to the candy art. This includes first a "soft seal" coating of an aqueous solution of sugar, starch, corn syrup, color and flavor. A "hard coat" is then applied using a sugar syrup and color. A coat of smoothing syrup is then applied using a sugar syrup plus a gum, such as gum arabic, and vanillin. This candy coating which can vary from as little as less than 5% by weight of the chip but can be as high as 20%, is then given a final thin coating of an edible shellac, varnish, or wax at a level of less than 0.1% of the chip. Any food grade shellac or varnish can be used while a hard wax such as carnauba wax is preferred if a wax is used.

The following examples are given to illustrate the scope and spirit of this invention. They are preferred embodiments, and the invention should not be limited thereto.

EXAMPLE 1

Aqueous Dispersion of Hydrated Food Ingredients

An aqueous dispersion was produced with the following composition:

| Ingredients | (Weight %) |
|---|---|
| Water | 79.7 |
| Xanthan gum | 1.0 |
| Guar gum | 1.0 |
| Dextrose | 2.3 |
| Oat fiber (88.4% insoluble fiber) | 3.6 |
| Milk solids non-fat (36% protein) | 12.4 |

The dispersion was prepared by thoroughly blending all the dry ingredients and then, using a Hobart™ A-200 mixer with a 20-quart bowl and a wire whip, mixing all of the ingredients for 30 seconds on 2nd speed. This pre-mix was then passed through a Gaulin™ laboratory homogenizer (14M-8TA) at 1500 psi 1st stage and 500 psi 2nd stage. The resulting product was a smooth aqueous dispersion with a moisture content of 81.5% and a pH of 6.7.

EXAMPLE 2

Low-Fat Chocolaty Chip

A chocolaty chip was prepared from the following formulation:

| Ingredients | (Weight %) |
|---|---|
| Aqueous dispersion (Ex. 1) | 12.6 |
| Syrups | 4.8 |
| Chocolate Flavor | 1.0 |
| 10X Sugar (50 microns) | 52.4 |
| Low Fat Cocoa | 23.0 |
| Non-Fat Dry Milk | 4.0 |
| Starch | 2.0 |
| Salt | 0.2 |
| TOTAL | 100.0 |
| TOTAL MOISTURE CONTENT | 12.9 |
| TOTAL FAT CONTENT | 3.5 |

A wet mix of the Example 1 dispersion, syrups and chocolate flavor is first made by thoroughly mixing the wet ingredients. The 10X sugar and the remaining dry ingredients are mixed together at low speed for 6–8 minutes or until thoroughly blended. The wet mix is then added to the dry blend and blended in a mixer (Hobart) until a lumpy, caked powder is formed. The mixture is then fed into a pasta maker where it is extruded and cut into $\frac{1}{8}''$ to $\frac{1}{4}''$ short cylinders with a rotary knife. The small cylinders are then put into a rotary coating reel to round the edges. The chips are then "aged" or "tempered" overnight (for at least 12 hours) to equilibrate the moisture.

A confectionary panning machine may be a useful alternative to a coating reel. Such machines have a higher tumbling rate and will reduce the number of double chips, make the chips more ball-like, intensify chip color and increase the density of the individual chips.

The "aged" chips have an acceptable taste, texture and mouthfeel and can be used in a cookie dough mix which is baked in an oven. This dough mix typically has a moisture content of about 10–20% prior to baking and about 5–16% after baking. The chips do not melt, remain hard, and retain their integrity during the baking process. The chips, of course, can also be used in other low-fat bakery products, such as cakes. Cakes have a high moisture content, typically about 20–42% prior to baking and about 16–40% after baking. In these higher moisture, baked goods applications, the chocolate chips turn into a soft, pudding-like texture during baking which is very different than a conventional chip. The chips can also be used in low-fat non-bakery products, such as ice cream.

EXAMPLE 3

Low-Fat Chocolaty Chip

A chocolaty chip was prepared from the following formulation according to the procedure of Example 2:

| Ingredients | (Weight %) |
|---|---|
| Aqueous dispersion (Ex. 1) | 14.0 |
| Sugar Syrup | 4.8 |
| Chocolate Flavor | 0.1 |
| 10X Sugar (50 microns) | 51.9 |
| Cocoa | 23.0 |
| Non-Fat Dry Milk | 4.0 |
| Starch | 2.0 |
| Salt | 0.2 |
| TOTAL | 100.0 |
| TOTAL MOISTURE CONTENT | 14.0 |
| TOTAL FAT CONTENT | 0.7 |

This chip had an improved overall chocolate taste and flavor despite the minimal amount of (0.1%) of chocolate flavor added to the formula. The fat content of this chip was less than 1% (0.7%).

EXAMPLE 4

Chocolaty Chip Loaf Cake

A chocolaty chip loaf cake was prepared from the following batter formulation:

| Ingredients | Weight % |
| --- | --- |
| Aqueous Dispersion (Ex. 1) | 5.4 |
| Sugars | 21.2 |
| Flour | 19.0 |
| Liquid Egg Whites | 14.6 |
| Water | 14.0 |
| Emulsifiers | 0.4 |
| Starch | 1.8 |
| Leavening Agents | 0.8 |
| Flavors and Colors | 2.1 |
| Preservatives | 0.1 |
| Non-Fat Dry Milk | 2.1 |
| Maltodextrin | 1.8 |
| Sugar Syrup | 2.1 |
| Low-Fat Chocolaty Chips (Ex. 2) | 14.6 |
| TOTAL | 100.0 |

The batter ingredients (excluding the chocolaty chips) were mixed in a two-stage continuous mixer. The chips were then added to the batter which was baked in loaf pans. The resulting cake had excellent grain, texture and volume. The moisture content of the freshly baked cake was 38.6% by weight, the pH of the cake was 6.7, and the $A_w$ was 0.89. The chips in the freshly baked cake had a soft fudge-like or cream consistency similar to a chocolate pudding and unlike the hard consistency of the chips in a cookie. Cookie dough has a relatively low moisture content (below about 20%) so that when the chocolaty chips of this invention are blended with cookie dough and baked, the chips do not melt, but retain their texture, shape and integrity.

EXAMPLE 5

Candy Coated Low-Fat Chocolate Chip

The chocolaty chips of Example 2 were candy coated with the following coating formulations:

| | Weight (Gms) |
| --- | --- |
| Soft Seal Coating | |
| Dextrin | 37 |
| Boiling water | 151 |
| Sugar | 48 |
| Corn Syrup | 65 |
| Color | 28 |
| Flavor | 4 |
| Hard Coating | |
| Hot water | 45 |
| Sugar | 65 |
| Color | 3 |
| Smoothing Syrup | |
| Gum | 1 |
| Warm water | 22 |
| Sugar | 30 |

A 3 lb. batch of the chocolate chips was placed in a pan-coating machine. The chips were first coated with the "Soft Seal" at room temperature until between a 5% to 10% coating was uniformly applied to the chips. Then the "Hard Coating" was applied until about a 1% to 5% coating was obtained. Drying air at ambient temperature was blown in while applying this coating. Finally, the smoothing syrup was applied at the 1% to 5% level. The candy coating was then sealed with an edible food grade shellac applied at a level of less than 0.1%.

The candy coated chocolaty chips gave a bite similar to the texture and mouthfeel of a traditional full-fat candy-coated chocolate chip.

EXAMPLE 6

Low-Fat Pecan Flavored Chip

A nut chip was prepared from the following formulation following the procedure of Example 2:

| Ingredients | (Weight %) |
| --- | --- |
| Aqueous dispersion (Ex. 1) | 12.6 |
| Sugar Syrup | 4.2 |
| Flavor (Pecan) | 0.5 |
| 10X Sugar (50 microns) | 58.3 |
| Peanut Flour (32% fat) | 10.5 |
| Non-Fat Dry Milk | 5.8 |
| Starch | 2.1 |
| Gum | 0.2 |
| Salt | 0.5 |
| TOTAL | 100.0 |
| Fiber (0% fat) | 5.3 |
| TOTAL MOISTURE CONTENT | 12.9 |
| TOTAL FAT CONTENT | 3.0 |

The pecan flavored chips had an acceptable taste, texture and mouthfeel. Similar to the Example 2 chips, they did not melt when placed in a cookie dough mix of 10-20% moisture and baked in an oven. They displayed the same pudding-like texture when placed in a cake batter containing 20-42% moisture and baked in an oven.

EXAMPLE 7

Low-Fat Pecan Flavored Chip

A nut chip was prepared from the following formulation following the procedure of Example 2:

| Ingredients | (Weight %) |
| --- | --- |
| Aqeuous dispersion (Ex. 1) | 11.9 |
| Sugar Syrup | 4.2 |
| Flavor (Pecan) | 0.1 |
| 10X Sugar (50 microns) | 61.4 |
| Peanut Flour (15% fat) | 19.8 |
| Starch | 2.0 |
| Gum | 0.2 |
| Salt | 0.4 |
| TOTAL | 100.0 |
| TOTAL MOISTURE CONTENT | 12.9 |
| TOTAL FAT CONTENT | 3.0 |

The pecan flavored chips had an acceptable taste, texture and mouthfeel. Similar to the Example 2 chips, they did not melt when placed in a cookie dough mix of 10-20% moisture and baked in an oven. They displayed the same pudding-like texture when placed in a cake batter containing 20-42% moisture and baked in an oven.

EXAMPLE 8

White Chip

A white chip was prepared from the following formulation following the procedure of Example 2:

| Ingredients | (Weight %) |
| --- | --- |
| Aqueous dispersion (Ex. 1) | 11.8 |

-continued

| Ingredients | (Weight %) |
| --- | --- |
| Sugar Syrup | 4.0 |
| Flavor/Color | 0.4 |
| 10X Sugar (50 microns) | 51.4 |
| Fiber (0% fat) | 15.0 |
| Gum | 0.2 |
| Non–Fat Dry Milk | 15.0 |
| Starch | 2.0 |
| Salt | 0.2 |
| TOTAL | 100.0 |
| TOTAL MOISTURE CONTENT | 13.0 |
| TOTAL FAT CONTENT | 0.0 |

The white (neutral flavored) chips had an acceptable taste, texture and mouthfeel. Similar to the Example 2 chips, they did not melt when placed in a cookie dough mix of 10–20% moisture and baked in an oven. They displayed the same pudding-like texture when placed in a cake batter containing 20–42% moisture and baked in an oven.

Those skilled in the art will make numerous modifications and variations of this invention as described herein. Consequently, only such limitations as appear in the appended claims should be placed on this invention.

What is claimed is:

1. A low-fat confectionary material containing less than 10% fat comprising a mixture of granulated sugar and granulated or powdered insoluble, non-gummy food material which is stable to normal processing conditions, said confectionary material having a moisture content of about 10% to about 15%, said sugar having a particle size of below 150 microns, said non-gummy food material having a fat content below about 15%, and said sugar to said non-gummy food material having a weight ratio of between about 2:1 and about 4:1; and wherein the ratio of granulated sugar to any liquid sugar in the confectionary material, as formulated, is above 5:1.

2. The material of claim 1 wherein an aqueous dispersion of hydrated food material is added as a source of both free moisture and bound moisture.

3. The material of claim 2 wherein the hydrated food material is taken from the group consisting of hydrated polysaccharide hydrocolloids, hydrated insoluble fibers, hydrated proteins, and mixtures thereof.

4. The material of claim 1 as a chocolaty chip wherein the granulated sugar is sucrose at about 50–70%, the insoluble, non-gummy food material is cocoa at about 10–30%, the sucrose having a particle size less than 60 microns, and wherein said material contains about 2–6% of syrup, and about 2–6% non-fat dry milk solids.

5. The material of claim 4 wherein the sugar to cocoa ratio is about 3:1 and the moisture content is about 11–13%.

6. The material of claim 1 as a nut chip wherein the granulated sugar is sucrose at about 40–70%, the insoluble, non-gummy food material is peanut flour or a mixture of peanut flour and a vegetable fiber at about 10–30%, the sucrose having a particle size of less than 60 microns, and wherein said chip contains about 2–6% syrup, and about 2–6% non-fat dry milk solids.

7. The material of claim 1 as a white chip wherein the granulated sugar is sucrose at about 40–70%, the insoluble, non-gummy food material is a vegetable fiber at about 10–30%, the sucrose having a particle size of less than 60 microns, and wherein said chip contains about 2–6% syrup, and about 2–6% non-fat dry milk solids.

8. The material of claim 1 wherein the insoluble, non-gummy food material is selected from the group consisting of cocoa, vanilla, roasted coffee, nuts, coconut, cereal fiber, vegetable fiber, edible mineral salts, citric waste and bone meal.

9. A low-fat chocolaty chip containing less than 10% cocoa butter which has a doughy consistency and comprises about 40% to about 70% granulated sugar having a particle size of below 100 microns, about 10% to about 30% low-fat cocoa, a moisture content of about 10 to about 15%, and an aqueous dispersion of hydrated polysaccharide hydrocolloid comprising an anionic gum and a galactomannan gum, said dispersion providing at least some of the moisture and retaining at least some of the moisture in the bound state, said sugar and cocoa being in a ratio by weight of between about 2:1 and about 4:1; and wherein the ratio of granulated sugar to any liquid sugar in the chip, as formulated, as above 5:1.

10. The chip of claim 9 wherein the granulated sugar is sucrose, the aqueous dispersion is about 6–18% of the chip and wherein the dispersion has a paste-like consistency, a Brookfield viscosity of at least 6 and comprises from 2 to 35% solids basis the weight of polysaccharide hydrocolloids, insoluble fiber and protein in the aqueous dispersion and wherein the weight ratio of polysaccharide hydrocolloid to insoluble fiber to protein is 1:0.8–6:1.1–4.5.

11. The chip of claim 9 wherein the chip contains about 11% to about 13% moisture, about 2% to about 6% syrup, about 2% to about 6% non-fat dry milk solids, and said sugar cocoa ratio is at about 3:1 on a weight basis.

12. The chip of claim 11 wherein the chip is candy-coated and then sealed with an edible food grade shellac, varnish or wax.

13. The chip of claim 11 in a baked cookie dough wherein the moisture content of the baked dough is about 5–16% and said chip is in a form which retains its integrity and has not melted.

14. The chip of claim 11 in a baked loaf cake wherein the moisture content of the baked cake is about 16–40% and said chips have a melted, pudding-like consistency.

15. The chip of claim 14 in a baked loaf cake wherein the moisture content of the cake is about 38.6%, the pH about 6.7 and the Aw about 0.89.

16. A process for making a fat-free chocolaty material containing less than about 10% cocoa butter which comprises:
mixing into a dough about 40% to about 70% granulated sugar, about 10% to about 30% low-fat cocoa, and about 10% to about 15% moisture, said sugar having a particle size below 100 microns, and said sugar to cocoa ratio being between about 2:1 and about 4:1; and wherein the ratio of granulated sugar to any liquid sugar in the dough is above 5:1,
forming the dough into a suitable shape; and
cutting the shape into pieces.

17. The process of claim 16 wherein an aqueous dispersion of hydrated food material is added to the dough mixture as a source of moisture.

18. The process of claim 17 wherein the hydrated food material is taken from the group consisting of hydrated polysaccharide hydrocolloids, hydrated insoluble fibers, hydrated proteins, and mixtures thereof.

19. The process of claim 16 wherein the dough contains about 2–6% of a syrup, and about 2–6% non-fat dry milk solids.

20. The process of claim 16 wherein the granulated sugar in the dough is sucrose having a particle size of less than about 60 microns, the sugar to cocoa ratio is about 3:1 and moisture content of the dough is about 11-13%.

21. The process of claim 16 wherein the granulated sucrose in the dough is at least 80% of the total sugar.

22. The process of claim 21 wherein the chocolaty chips are added to a cookie dough containing about 10-20% moisture, and baking the dough, said chips in the baked cookie dough not melting, or losing their integrity.

23. The process of claim 21 wherein the chips are added to a loaf cake batter containing 20-42% moisture, and baking the loaf cake, said chips in the freshly baked loaf cake having a melted, pudding-like consistency.

24. The process of claim 23 wherein the freshly baked loaf cake has a moisture content of about 38.6%, a pH of about 6.7, and an $A_w$ of about 0.89.

* * * * *